Patented Sept. 7, 1926.

1,598,707

UNITED STATES PATENT OFFICE.

GEORG BREDIG AND EGON ELÖD, OF KARLSRUHE, GERMANY, ASSIGNORS TO THE FIRM OF RUDOLPH KOEPP & CO., OF OESTRICH-ON-THE-RHINE, GERMANY, A SOCIETY ORGANIZED UNDER THE LAWS OF GERMANY.

PROCESS FOR THE PRODUCTION OF HYDROCYANIC ACID.

No Drawing. Original application filed January 28, 1924, Serial No. 689,156, and in Germany December 7, 1922. Divided and this application filed November 21, 1924. Serial No. 751,374.

This application is a division of application, Serial Number 689,156, filed January 28, 1924.

Various methods for the production of hydrocyanic acid have become known which are based upon the passing of ammonia and carbon monoxide for gases containing the mentioned substances at higher temperatures over substances possessing a catalytic effect. For instance, carbides of elements of group IV according to Mendelejeff's periodical system, e. g. carbides of silicium or titanium or zirconium or the like or mixtures or combination of such carbides for instance silit which is a mixture of silicon carbide and uncombined silicon or siloxikon which is a mixture of silicon oxycarbides are adapted to the purposes mentioned.

A special advantage in using these carbides may be seen in their acting catalytically on the one hand and as good conductors of heat and electricity on the other hand. They may be used alone as catalysts or together with other catalysts and in this case especially as carriers for the other catalysts. It will be possible, for instance, to bring into these carbides aluminium oxide, the oxides of the thorium, cerium, zirconium, vanadium and the like, or mixtures of such catalysts.

The use of carbides, according to the invention, presents the further advantage that electric internal heating may be used, for instance, in such a manner that the contact mass is inserted as a single heating body or loosely, for instance in the shape of grains, in an electric circuit. This manner of heating presents the advantage that the contact mass can be brought to the desired temperature and maintained in the same only by regulating the intensity of the current.

The production of the hydrocyanic acid with the aid of the above mentioned catalysts can be carried out in the usual manner for instance by passing the mixture of the gaseous or vapourous initial substances, that is ammonia and carbon monoxide, over the catalysts at convenient temperatures. Specially good results are obtained by working with a considerable excess of carbon monoxide or substances containing the same, e. g. generator gas, gas from coking or the like, and in avoiding too high temperatures. Specially good outputs in hydrocyanic acid, as compared with the nitrogen compounds, were obtained with a proportion of approximately 5–10 vol. parts of carbon monoxide to 1 vol. part of ammonia.

It has further been found that by a considerable addition of hydrogen or substances containing this gas, the yield may be improved in the mentioned process. The hydrogen or substances containing hydrogen, as for instance water gas or gases and vapours from molasses-waste and the like, act as protecting gases in such a way that the decomposition of ammonia even under ordinary pressure, is reduced considerably more than when working only with an excess of carbon monoxide.

The height of temperature depends on the quality of the catalysts, on the kind of reaction gas and diluting means, the concentration of the gaseous nitrogen combination, and on the velocity of flow of the gases. It is generally advisable to select temperatures between 400 and 800° C. Temperatures between 500 and 600° C. are especially advantageous.

When working according to the invention it is possible to convert the nitrogen compounds used almost quantitatively into hydrocyanic acid. Further advantages consist in the possibility of working also moist gases, so that the process of preliminary drying the same is superseded. Moreover it is not necessary that the gas be specially pure.

On account of the knowledge of the perniciousness of iron it is advisable to avoid iron and iron compounds, especially also an iron apparatus. The apparatus may preferably consist, for instance, of copper or of ceramic material.

*Examples.*

1. 20 cubic meters of carbon monoxide and 10 cubic meters of ammonia are made to pass at 550° over a catalyst consisting of carborundum on which vanadium oxide is incorporated. About 2.4 kg. of hydrocyanic acid and besides above 5.8 cubic meters of unaltered ammonia are obtained per hour.

2. 100 cubic meters of water gas and 10 cubic meters of ammonia are passed at 600° C. over carborundum as catalysts which contains vanadium oxide. The output per hour will be about 3 kg. of hydrocyanic acid and about 6.7 cubic meters of unaltered ammonia.

3. 10 cubic meters of ammonia gas, 30 cubic meters of carbon monoxide, and 100 cubic meters of hydrogen are conducted at about 600° C. over a contact body consisting of silicon carbide with cerium oxide as catalyst. After the gas mixture has passed several times over the contact approximately 10.6 kg. of hydrocyanic acid are obtained.

4. 100 cubic meters of water gas and 10 cubic meters of ammonia gas are conducted at 600° C. over a catalyst which consists of silicon carbide containing cerium oxide. About 3.0 kg. of hydrocyanic acid and about 6.7 cubic meters of unaltered ammonia are obtained per hour.

What we claim is:—

1. A process for the production of hydrocyanic acid at raised temperature characterized by allowing ammonia and carbon monoxide to react in the presence of carbides of elements of group IV according to Mendelejeff's periodic system.

2. A process for the production of hydrocyanic acid by allowing ammonia and carbon monoxide to react in a heated condition, in the presence of silicon carbide.

3. A process for the production of hydrocyanic acid by allowing ammonia and carbon monoxide, to react in a heated condition, in the presence of carbides of elements of group IV according to Mendelejeff's periodic system and of other catalytically acting substances.

4. A process for the production of hydrocyanic acid by allowing ammonia and carbon monoxide to react in a heated condition, in the presence of aluminium oxide and of carbides of elements of the group IV according to Mendelejeff's periodic system.

5. A process for the production of hydrocyanic acid by allowing ammonia and carbon monoxide to react in a heated condition, in the presence of silicon carbide and aluminium oxide.

6. A process for the production of hydrocyanic acid by allowing ammonia and carbon monoxide to react in a heated condition, in the presence of silicon carbide, titanium carbide, and aluminium oxide.

7. A process for the production of hydrocyanic acid by allowing ammonia and carbon monoxide to react in a heated condition in the presence of carbides and other catalysts of elements of group IV according to Mendelejeff's periodic system the carbides serving as carriers for the other catalysts.

8. A process for the production of hydrocyanic acid by allowing ammonia and carbon monoxide to react, the latter being used in excess, in a heated condition in the presence of carbides of elements of the group IV according to Mendelejeff's periodic system.

9. A process for the production of hydrocyanic acid by allowing ammonia and carbon monoxide to react, the latter being used in excess, in a heated condition, in the presence of silicon carbide.

10. A process for the production of hydrocyanic acid by allowing ammonia and carbon monoxide to react, the latter being used in excess, in a heated condition in the presence of silicon carbide and of aluminium oxide.

11. A process for the production of hydrocyanic acid by allowing ammonia and carbon monoxide to react, in a heated condition, in the presence of carbides of elements of the group IV according to Mendelejeff's periodic system and in using hydrogen for protecting the ammonia from decomposition.

12. A process for the production of hydrocyanic acid by allowing ammonia and carbon monoxide to react, in a heated condition, in the presence of silicon carbide and in using hydrogen for protecting the ammonia from decomposition.

13. A process for the production of hydrocyanic acid by allowing ammonia and carbon monoxide to react, in a heated condition, in the presence of silicon carbide and of aluminium oxide and in using hydrogen for protecting the ammonia from decomposition.

14. A process for the production of hydrocyanic acid by allowing ammonia and carbon monoxide to react, the latter being used in excess, in a heated condition, in the presence of carbides of elements of group IV according to Mendelejeff's periodic system and in using hydrogen for protecting the ammonia from decomposition.

In testimony whereof we affix our signatures.

GEORG BREDIG.
EGON ELÖD.